United States Patent
Palumbo

(10) Patent No.: US 10,009,505 B2
(45) Date of Patent: Jun. 26, 2018

(54) ASYNCHRONOUSLY REQUESTING INFORMATION FROM A CAMERA DEVICE

(71) Applicant: Apple Inc., Cupertino, CA (US)

(72) Inventor: Ryan W. Palumbo, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/099,368

(22) Filed: Apr. 14, 2016

(65) Prior Publication Data
US 2016/0309054 A1 Oct. 20, 2016

Related U.S. Application Data

(60) Provisional application No. 62/147,396, filed on Apr. 14, 2015.

(51) Int. Cl.
- H04N 1/32 (2006.01)
- H04N 5/232 (2006.01)
- H04N 1/00 (2006.01)

(52) U.S. Cl.
CPC ..... H04N 1/32454 (2013.01); H04N 1/00204 (2013.01); H04N 1/00214 (2013.01); H04N 1/32374 (2013.01); H04N 5/23206 (2013.01); H04N 2201/0084 (2013.01)

(58) Field of Classification Search
CPC ........... H04N 5/23206; H04N 1/00127; H04N 1/00204; H04N 2201/001; H04N 1/32443; H04N 1/32448; H04N 1/32454
See application file for complete search history.

(56) References Cited

U.S. PATENT DOCUMENTS

| | | | | |
|---|---|---|---|---|
| 5,457,544 A * | 10/1995 | Ochiai | ............... | H04N 1/32363 358/404 |
| 5,720,014 A * | 2/1998 | Ikeda | ............... | H04N 1/00204 358/1.15 |
| 6,750,902 B1 * | 6/2004 | Steinberg | ............... | G03B 7/091 348/207.1 |
| 6,970,189 B1 * | 11/2005 | Bernstein | ............... | H04N 5/232 348/207.99 |
| 7,479,983 B2 * | 1/2009 | Fisher | ............... | H04N 1/00209 348/207.1 |
| 9,692,967 B1 * | 6/2017 | Bamberger | ......... | H04N 5/23293 |
| 2002/0075392 A1 * | 6/2002 | Imaeda | ............... | H04N 1/21 348/333.05 |
| 2002/0093575 A1 * | 7/2002 | Kusaka | ............... | H04N 5/232 348/231.9 |
| 2004/0109062 A1 * | 6/2004 | Yamaya | ............... | H04N 1/2129 348/207.1 |
| 2004/0174434 A1 * | 9/2004 | Walker | ............... | G06F 17/30265 348/211.3 |

(Continued)

*Primary Examiner* — Twyler Haskins
*Assistant Examiner* — Akshay Trehan
(74) *Attorney, Agent, or Firm* — Blank Rome LLP

(57) ABSTRACT

Image transport includes receiving, at an accessory camera device, an asynchronous operation request from an electronic device for a first quantity of image data, determining, by the accessory camera device, a second quantity of image data that the accessory camera device is capable of transmitting to the asynchronous operation request, transmitting an indication of the second quantity of image data to the electronic device, and sending a response comprising the second quantity of image data to the electronic device.

21 Claims, 6 Drawing Sheets

(56) References Cited

U.S. PATENT DOCUMENTS

| | | | |
|---|---|---|---|
| 2004/0183915 A1* | 9/2004 | Gotohda | H04N 5/232 348/207.11 |
| 2004/0221044 A1* | 11/2004 | Rosenbloom | H04L 29/06 709/227 |
| 2005/0105128 A1* | 5/2005 | Konno | H04N 1/00347 358/1.15 |
| 2005/0111036 A1* | 5/2005 | Takasaki | H04N 1/00127 358/1.15 |
| 2005/0177794 A1* | 8/2005 | Kameyama | G06F 3/0482 715/748 |
| 2006/0150109 A1* | 7/2006 | Schultz | G06F 9/4443 715/759 |
| 2006/0171695 A1* | 8/2006 | Jung | G06T 3/4023 396/56 |
| 2006/0274153 A1* | 12/2006 | Levien | H04N 1/00132 348/207.1 |
| 2006/0274154 A1* | 12/2006 | Levien | H04N 1/00251 348/207.1 |
| 2006/0274157 A1* | 12/2006 | Levien | H04N 1/2112 348/220.1 |
| 2006/0274163 A1* | 12/2006 | Levien | H04N 1/00137 348/231.2 |
| 2006/0274165 A1* | 12/2006 | Levien | H04N 1/2112 348/231.6 |
| 2007/0050829 A1* | 3/2007 | Asami | H04N 1/00209 725/105 |
| 2007/0052856 A1* | 3/2007 | Jung | H04N 1/2166 348/565 |
| 2007/0098348 A1* | 5/2007 | Jung | H04N 7/181 386/240 |
| 2007/0139529 A1* | 6/2007 | Levien | G06T 1/00 348/220.1 |
| 2007/0188621 A1* | 8/2007 | Kitagawa | H04N 1/00127 348/211.99 |
| 2007/0252896 A1* | 11/2007 | Hatanaka | G06F 3/0611 348/207.1 |
| 2008/0010255 A1* | 1/2008 | Lee | H04N 1/00931 |
| 2008/0141051 A1* | 6/2008 | Lee | H04L 12/10 713/323 |
| 2008/0192129 A1* | 8/2008 | Walker | G11B 27/034 348/231.2 |
| 2008/0199173 A1* | 8/2008 | Inoue | G03B 7/00 396/213 |
| 2009/0037605 A1* | 2/2009 | Li | G06Q 20/12 709/246 |
| 2009/0040331 A1* | 2/2009 | Kitagawa | H04N 1/00204 348/222.1 |
| 2009/0083765 A1* | 3/2009 | Davis | G06F 9/5055 719/321 |
| 2009/0222809 A1* | 9/2009 | Krig | G06F 8/65 717/171 |
| 2010/0118180 A1* | 5/2010 | Matsushita | H04N 5/23241 348/372 |
| 2010/0141762 A1* | 6/2010 | Siann | H04N 7/185 348/143 |
| 2010/0144273 A1* | 6/2010 | Sekikawa | H04N 1/00204 455/41.2 |
| 2010/0271490 A1* | 10/2010 | Jung | H04N 1/00132 348/207.1 |
| 2011/0037865 A1* | 2/2011 | Takagi | H04N 5/232 348/211.9 |
| 2011/0047341 A1* | 2/2011 | Yu | G06F 11/1464 711/162 |
| 2013/0113944 A1* | 5/2013 | Fukushima | H04N 5/225 348/207.1 |
| 2014/0140258 A1* | 5/2014 | Sadeghi | H04L 47/39 370/312 |
| 2014/0168453 A1* | 6/2014 | Shoemake | H04N 5/23206 348/207.11 |
| 2015/0022666 A1* | 1/2015 | Kay | H04L 67/025 348/159 |
| 2015/0077577 A1* | 3/2015 | Terashita | H04N 5/23206 348/207.11 |
| 2015/0103235 A1* | 4/2015 | Yoshizawa | H04N 5/23241 348/372 |
| 2015/0146019 A1* | 5/2015 | Aoyama | H04N 1/00129 348/207.1 |
| 2015/0195442 A1* | 7/2015 | Pacurariu | H04N 5/23203 348/211.2 |
| 2016/0065887 A1* | 3/2016 | Ishizu | G09G 5/003 348/231.6 |
| 2016/0255230 A1* | 9/2016 | Tabushi | H04N 1/32673 358/1.14 |
| 2016/0309054 A1* | 10/2016 | Palumbo | H04N 1/32454 |
| 2017/0295311 A1* | 10/2017 | Tokunaga | H04N 5/23206 |

\* cited by examiner

ASYNCHRONOUSLY REQUESTING INFORMATION FROM A CAMERA DEVICE

BACKGROUND

This disclosure relates generally to the field of image transport, and more particularly to the field of asynchronously requesting information from a camera device. More specifically, this disclosure relates to asynchronously requesting and transmitting data information between an electronic device and an accessory camera device.

Digital cameras have become ubiquitous in today's electronic devices. Further, users often access or use photos on additional devices, for use in photography applications, image editing, and the like. Because digital cameras may be standalone devices, or part of a different device than that on which a user wishes to store or access the image data, image transport must occur. Typically, image data may be transferred between devices using a protocol, such as Picture Transport Protocol (PTP).

One drawback in the use of an accessory camera device is when requesting images from an accessory camera device, the capabilities of the accessory camera device may not be known to the requesting device. For example, the accessory camera device may be busy with other activities at the time of a request, or may have limited bandwidth.

SUMMARY

In one embodiment, a method for managing a secure session is disclosed. The method includes receiving, at an accessory camera device, an asynchronous operation request from an electronic device for a first quantity of image data, determining, by the accessory camera device, a second quantity of image data that the accessory camera device is capable of transmitting to the asynchronous operation request, transmitting an indication of the second quantity of image data to the electronic device, and sending a response comprising the second quantity of image data to the electronic device.

In another embodiment, the method may be embodied in computer executable program code and stored in a non-transitory storage device. In yet another embodiment, the method may be implemented by an electronic device.

DETAILED DESCRIPTION

Figure 1:
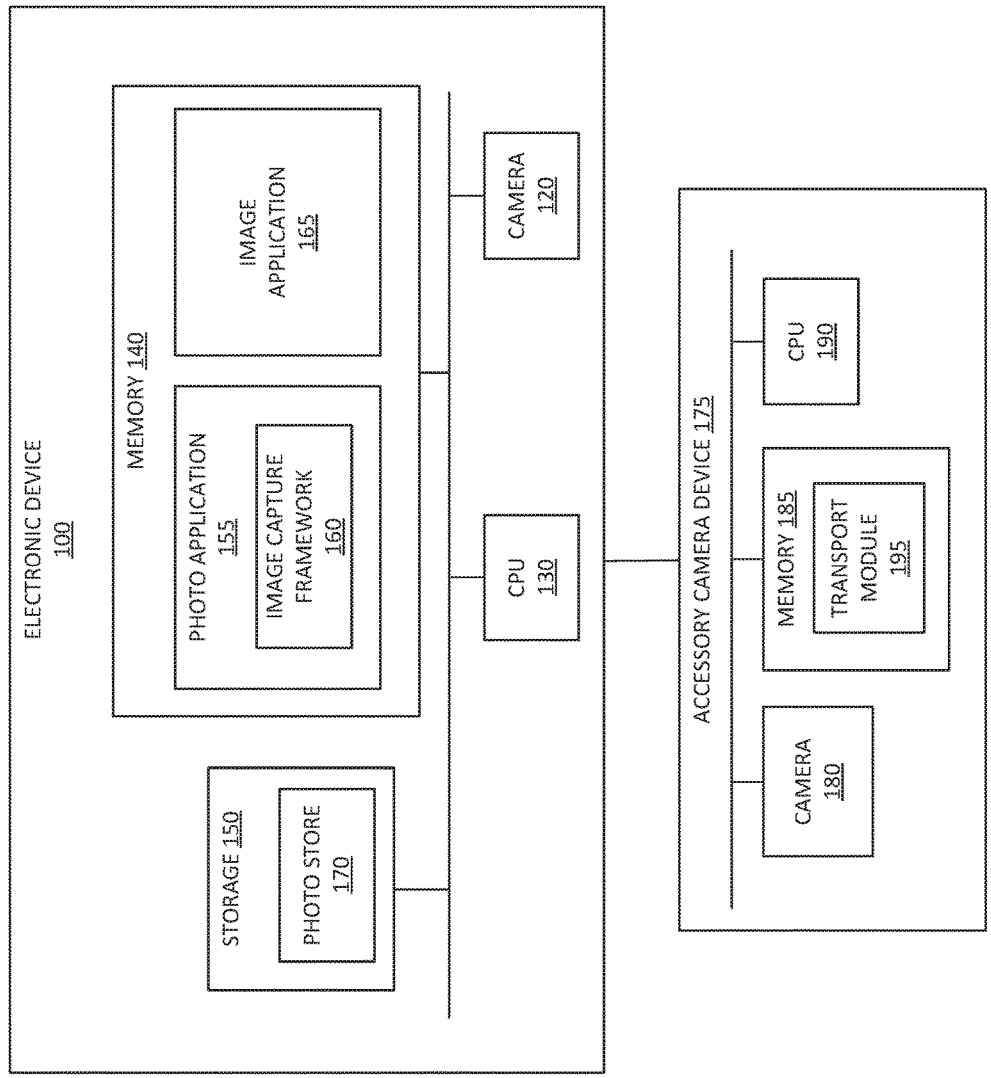
FIG. 1 shows, in block diagram form, a simplified block diagram of an electronic device and accessory device, according to one or more embodiments.

This disclosure pertains to systems, methods, and computer readable media for asynchronously requesting information from a camera device. In general, techniques are disclosed for asynchronously requesting and receiving image data from an accessory camera device. An electronic device may request a particular amount and/or type of image data from the accessory camera device. The camera device may respond with how much data the accessory camera device is capable of sending at the particular time, and the electronic device may either cancel the request and send another, or continue with the request based on the capability of the accessory camera device. In one or more embodiments, the accessory camera device may only be capable of sending less data than requested. The electronic device may follow up with a request for the remaining image data after the initial batch of data is received.

In the following description, for purposes of explanation, numerous specific details are set forth in order to provide a thorough understanding of the inventive concept. As part of this description, some of this disclosure's drawings represent structures and devices in block diagram form in order to avoid obscuring the disclosed subject matter. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram are presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the inventive subject matter. Reference in this disclosure to "one embodiment" or to "an embodiment" means that a particular feature, structure, or characteristic described in connection with the embodiment is included in at least one embodiment of the invention, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

FIG. 1 shows, in block diagram form, an overall view of a system diagram capable of supporting asynchronous request of image information from an accessory camera device, according to one or more embodiments. Specifically, FIG. 1 depicts an electronic device 100 that is a computer system. Electronic Device 100 may be connected to other network devices across a network, such as mobile devices, tablet devices, desktop devices, as well as network storage devices such as servers and the like. In various embodiments, Electronic Device 100 may comprise a desktop computer, a laptop computer, a video-game console, an embedded device, a mobile phone, tablet computer, personal digital assistant, portable music/video player, or any other electronic device that includes a camera system.

Electronic Device 100 may include a central processing unit (CPU) 130. Processor 130 may be a system-on-chip such as those found in mobile devices and include one or more dedicated graphics processing units (GPUs). Electronic Device 100 may also include a memory 140 and storage 150. Memory 140 and storage 150 may each include one or more different types of memory, which may be used for performing device functions in conjunction with CPU 130. For example, memory 140 and storage 150 may include cache, ROM, and/or RAM. Memory 140 and storage 150 may store various programming modules during execution, including various applications. In one or more embodiments, memory 140 may include applications directed to image data, such as photo application 155, and image application 165. Further, photo application 155 and image application 165 may include additional submodules, such as image capture framework 160. Electronic device 100 may also include a camera 120. Camera 120 may include an image sensor, a lens stack, and other components that may be used to capture images.

In one or more embodiments, storage 150 may include any storage media accessible by a computer during use to provide instructions and/or data to the computer, and may include multiple instances of a physical medium as if they were a single physical medium. For example, a machine-readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, RAMBUS DRAM (RDRAM) (RAMBUS is a registered trademark of Rambus Inc.), static RAM (SRAM)), ROM, non-volatile memory (e.g., Flash memory) accessible via a peripheral interface such as the USB interface, etc. Storage media may include micro-electro-mechanical systems (MEMS), as well as storage media accessible via a communication medium such as a network and/or a wireless link. Storage 150 may include photo store 170. In one or more embodiments, photo store 170 may store image data regarding images captured by camera 120 or accessory camera device 175. In one or more embodiments, image data may include, for example, digital images, thumbnail images, metadata regarding digital images, and the like.

In one or more embodiments, electronic device 100 may be operatively connected to an accessory camera device 175. In one or more embodiments, the electronic device 100 and accessory camera device 175 may be operatively connected across a network, such as a WAN, LAN, or the internet. In one or more embodiments, the electronic device 100 and accessory camera device 175 may be connected by Bluetooth or a USB connection.

In one or more embodiments, accessory camera device may include, at least, a camera 180, a memory 185, and a CPU 190. Camera 120 may include an image sensor, a lens stack, and other components that may be used to capture images. CPU 190 may be a system-on-chip such as those found in mobile devices and include one or more dedicated graphics processing units (GPUs).

Memory 185 may include one or more different types of memory, which may be used for performing device functions in conjunction with CPU 190. Memory 185 may include applications that run on accessory camera device 175, such as transport module 195. In one or more embodiments, application on the accessory camera device 175, such as transport module 195, may be utilized for management of operations of the camera 180. In addition, transport module 195 may be utilized to manage image data on accessory camera device 175, and to communicate with electronic device 100. In one or more embodiments, accessory camera device 175 may include additional storage that may store image data, such as digital images, thumbnails for the digital images, metadata for the digital images, and the like. The image data stored in storage in accessory camera device 175 may be generated from images captured by camera 180.

For example, in one or more embodiments, image capture framework 160 may be configured to generate and send asynchronous requests to accessory camera device 175. In one or more embodiments, the image capture framework 160 may request image data from the accessory camera device 175. The image capture framework may obtain image data from accessory camera device 175 for use by photo application 155, image application 165, or other applications on electronic device 100. In one or more embodiments, image capture framework 160 may generate and transmit asynchronous requests to the accessory camera device for image data.

In one or more embodiment, transport module 195 may manage requests received from electronic device 100 for image data. In one or more embodiments, accessory camera device 175 may receive a request for image data from electronic device 100 at a time when accessory camera device 175 is occupied with other processes. In one or more embodiments, the transport module 195 manages requests from the electronic device by initially responding with an indication of the capability of the accessory camera device to respond to the request. For example, the accessory camera device may be able to fully respond to the request if the request is small and the accessory camera device 175 is not busy. As another example, the accessory camera device may only be able to respond with a partial set of image data requested, or may not be able to respond at all. In one or more embodiments, the accessory camera device may wait for a request for results from the electronic device 100 after indicating the capability of the accessory camera device 175, or the accessory camera device 175 may respond with image data based on the capabilities of the accessory camera device 175 at the time of the request.

Figure 2:
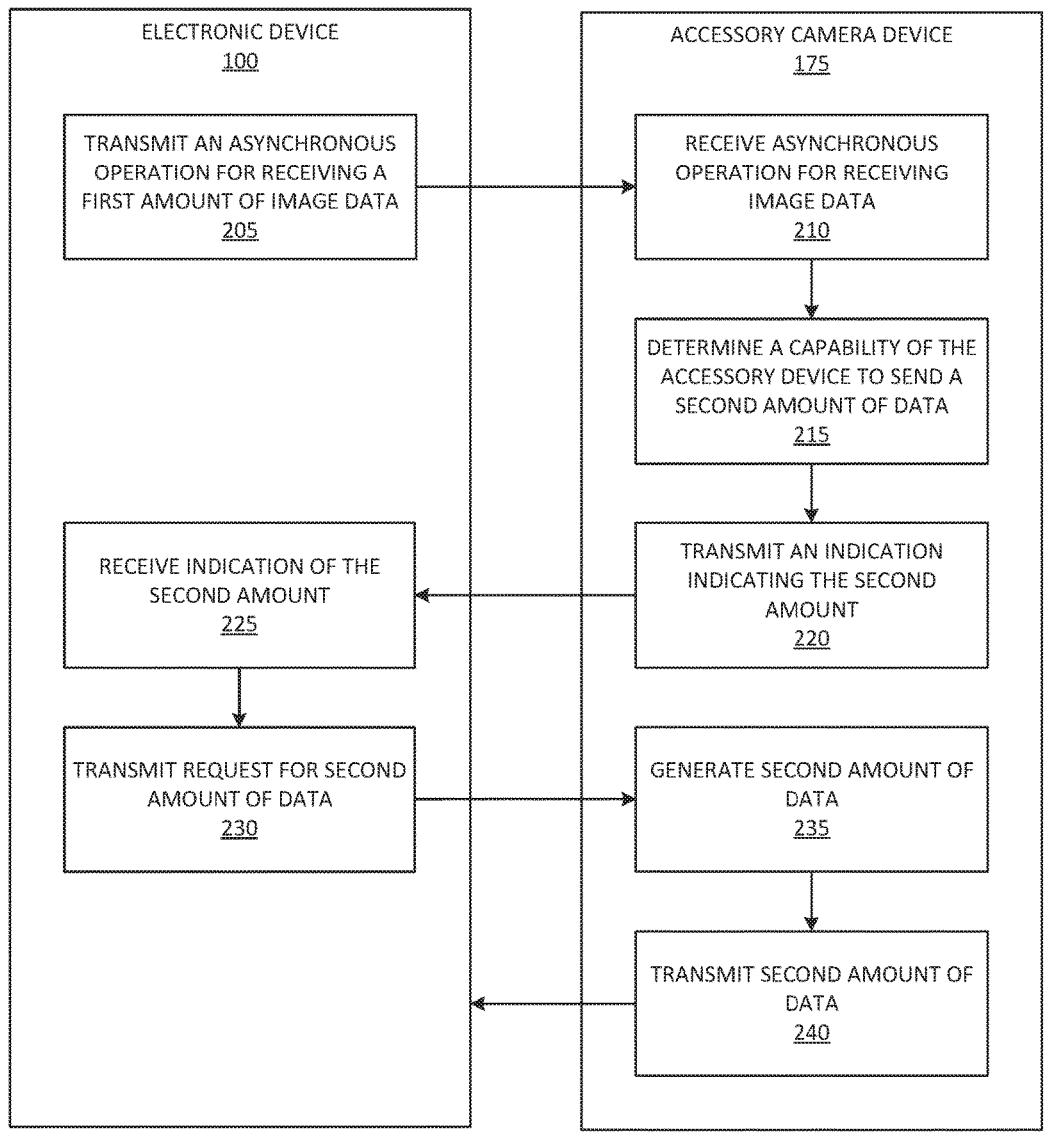
FIG. 2 shows, in flow chart form, a method for asynchronously requesting image data in accordance with one or more embodiments.

Turning to FIG. 2, an example a method for asynchronously requesting image data in accordance with one or more embodiments is presented. It should be understood that the various components of the flow chart described below may be performed in a different order or simultaneously, and some components may even be omitted in one or more embodiments. For purposes of this example, the various steps occur within electronic device 100 and accessory camera device 175. In one or more embodiments, steps performed by the electronic device may be performed by computer code in memory 185, such as transport module 195. Similarly, steps depicted as performed by accessory camera device 175 may be performed by computer code in memory 140, such as image capture framework 160.

The flow chart begins at 205, when the electronic device 100 transmits an asynchronous operation for receiving a first amount of image data from an accessory camera device 175. In one or more embodiments, the asynchronous operation may include such operations as getting object information from a storage of accessory camera device 175, getting thumbnails, with or without metadata, getting empty images, such as JPEG images with metadata, and the like. For example, Asynchronous operation codes may include requestThumbnails, requestMetadata, requestThumbnailsWithMetadata, retrieve Thumbnails, retrieveMetadata, retrieveThubnailsWithMetadata, and the like. In one or more embodiments, the asynchronous operation may include one or more parameters. In one or more embodiments, the one or more parameters may include an operation code, a storage ID, an object handle array, a quality parameter indicating the quality of the requested data, and geometric dimension data. As an example, regarding thumbnail images, a default size may be 640×480 pixels. However, other resolutions may include 1136×640, 853×640, 960×640, or 640×640. In one or more embodiments, each resolution may respectively be described as a parameter value of 0x000, 0x0001, 0x0010, 0x0100, and 0x1000. In one or more embodiments, the electronic device 100 may also transmit an ObjectHandleArray, which may indicate an object with which the data may be transmitted.

The flow chart continue at 210 where the accessory camera device 175 receives the asynchronous operation for receiving image data. The flow chart continues at 215 where the accessory camera device 175 determines a capability of the device to send the requested amount of data. In one or more embodiments, the accessory camera device may be capable of fully responding to the asynchronous operation, partially responding to the asynchronous operation, or not capable at all of responding to the asynchronous operation. The capabilities of the accessory camera device 175 may be determined, for example, on current processes executing on CPU 190, hardware capabilities of accessory camera device 175, available bandwidth, and the like. Thus, in one or more embodiments, the second amount of data may be the same amount of data as requested, a lesser amount of data as requested, or no data.

At 220, the accessory camera device 175 transmits and indication of the amount of data that the accessory device 175 is able to generate and transmit based on the asynchronous operation. In one or more embodiments, the accessory camera device 175 may transmit a message acknowledging the asynchronous operation, as well as a ready response. That is, in one or more embodiments, a first message may indicate to the electronic device 100 that the asynchronous operation is received, and the second message includes information regarding the capability of the accessory device. In the event the accessory device cannot handle the asynchronous operation, the message acknowledging the response may include information regarding why the accessory device 175 was unable to process the request, such as that the operation is not supported, the session is not open, the transaction ID or object handle are invalid, the store is unavailable, or a certain parameter in the asynchronous operation is not supported. In one or more embodiments, the ready response may indicate either that the accessory device 175 is ready to handle the asynchronous operation or not. In addition, if the accessory device 175 is able to handle at least part of the request, then the ready message may also include the operation code identifying the asynchronous request for which the accessory device 175 is responding, a total size of the data capable of being generated and transmitted by accessory device 175.

At 225, electronic device 100 receives the indication of the capability of the accessory camera device 175 to respond to the asynchronous operation. In one or more embodiments, the electronic device 100 may also receive the response message indicating that the accessory device 175 acknowledges the asynchronous operation.

The flow chart continues at 230 and the electronic device 100 transmits a request for the amount of data that the accessory camera device 175 indicated was capable of generating and transmitting. In one or more embodiments, the request message may include various parameters. The parameters in the request message may include, for example, an operation code indicating the asynchronous operation for which the request message is associated.

In one or more embodiments, the electronic device 100 may instead wish to request a different amount or type of data, after receiving the response from the accessory device 175. For example, by the time the electronic device 100 receives the ready message, a user at the electronic device may determine that a different amount or type of data is preferred. Although not shown, the electronic device may optionally transmit a second asynchronous operation. In one or more embodiments, the accessory device 175 may cancel an incomplete first asynchronous operation in response to receiving a second asynchronous operation.

Returning to FIG. 2, the flow chart continues at 235 and, in response to receiving the request for the second amount of data, the accessory device 175 may generate the requested second amount of data. In one or more embodiments, the accessory device 175 may begin generating the second amount of data at a different time, such as in response to determining the capability of the accessory device 175 to send the second amount of data. Once the image data is generated, then the flow chart continues at 240, and the accessory device 175 transmits the generated image data to the electronic device 100.

Figure 3:
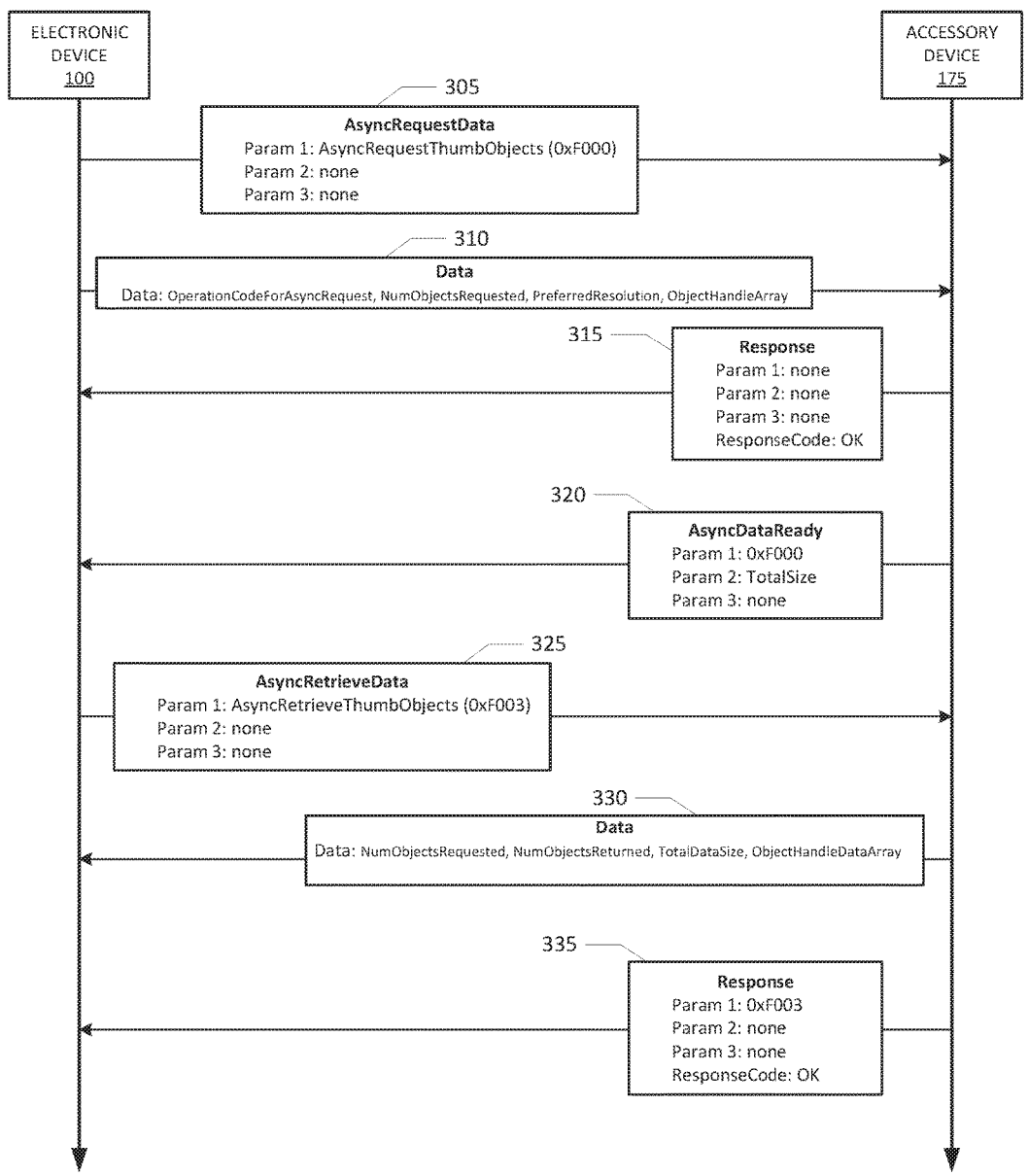
FIG. 3 shows, in flow diagram form, a method for transmitting image thumbnails in accordance with one or more embodiments.

FIG. 3 shows, in flow diagram form, a method for transmitting image thumbnails in accordance with one or more embodiments. FIG. 3 shows one example of the use of asynchronous operations by an electronic device to request image data, in this case thumbnail images, from an accessory camera device 175.

The flow diagram when electronic device 100 sends an asynchronous operation 305 to accessory device 175. In one or more embodiments, the Asynchronous Operation may be identified as AsyncRequestData, and may include several parameters. As indicated, the first parameter may identify a type of operation requested. In the example flow diagram, asynchronous operation 305 is AsyncRequestThumbnailObjects. The operation type may additionally, or alternatively, include a code indicating the type of operation. In the example, the code 0xF000 identifies that thumbnail objects are requested. In one or more embodiments, the electronic device 100 may also transmit a data message 310.

Data message 310 may include, for example, data to enable the responder to respond to the request. In one or more embodiments, these may include OperationCodeForAsyncRequest, NumObjectsRequested, Preferred Resolution, and ObjectHandleArray. The various parameters in the Data message 310 may identify, for example, a code for the particular request, a number of objects requested, a preferred resolution of the objects requested, and an object handle array with which the responder should respond with the data.

In response to receiving the asynchronous operation 305, the accessory device 175 may reply with a response message 315. As indicated, the response message 315 may indicate that the asynchronous operation is acknowledged. Further, a ready response 320 is generated by the accessory device 175. As described above, the ready response may include an indication of the asynchronous operation to which the accessory device 175 is responding. In the example, the accessory device 175 is responding to the asynchronous operation with an identification of 0xF000, in this example a request for thumbnails, in ready response 320. In addition, ready response indicates that the image data is ready to be retrieved. In one or more embodiments, the image data may be generated and ready for transmission when the ready response 320 is transmitted, or the image data may be ready to be generated. As depicted, the ready response 320 includes an indication of the capability of the accessory device 175 to respond to the asynchronous operation. In one or more embodiments, the "Total Data" parameter value may indicate the size, in bytes for example, of the image data the accessory device 175 is capable of sending to the electronic device 100.

In response to receiving the ready message, the electronic device 100 may send a request message 325, in this example identified as AsycRetrieveData. As shown above, AsyncRetrieveData may have its own code, as 0xF003. In one or more embodiments, the electronic device 100 may wait for the ready message 320 before transmitting the request message 325. As depicted in example request message 325, the request message may include an operation code parameter. After receiving the request message 325, the accessory device 175 may send a data message 330 with a thumbnail array comprising the requested data. The response may include a number of objects requested, a number of objects returned, a total data size, and the object handle data array. In one or more embodiments, the accessory device 175 may also transmit a response message 335 indicating that the transmission of the image data requested in the asynchronous operation 305 is complete.

Figure 4A:
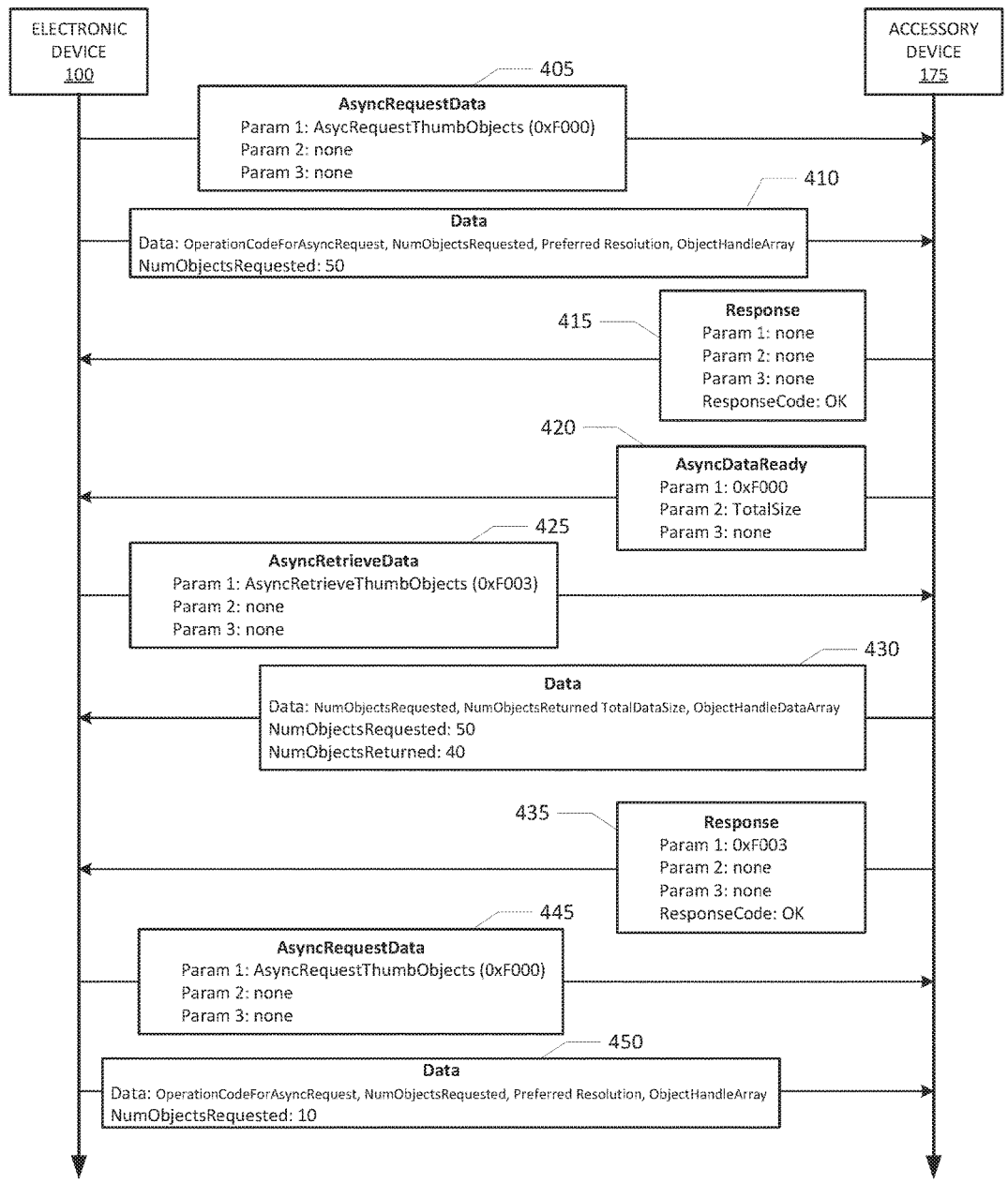
FIG. 4A shows, in flow diagram form, a first part of a method for transmitting image thumbnails in multiple transmissions in accordance with one or more embodiments.
Figure 4B:
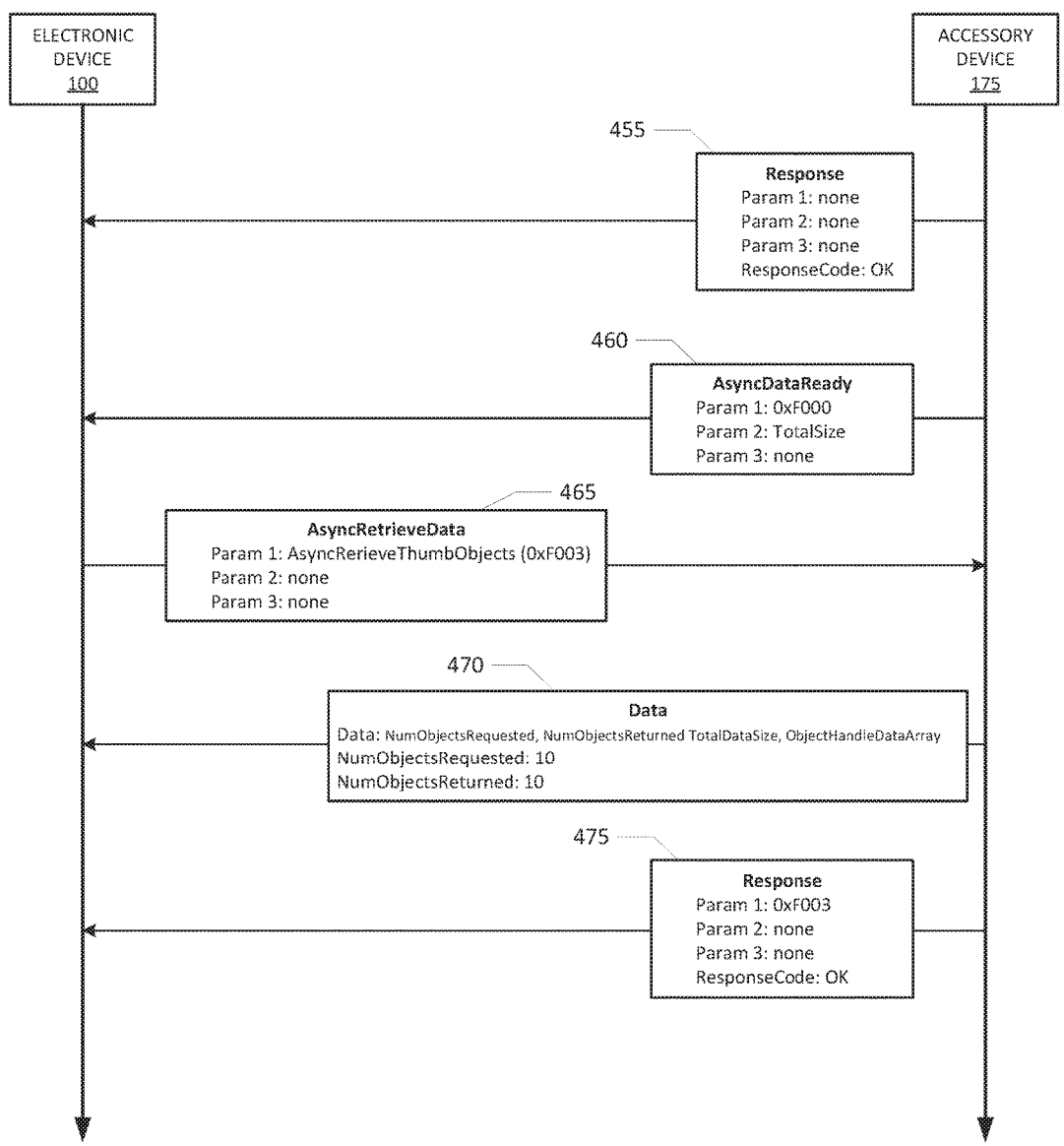
FIG. 4B shows, in flow diagram form, a second part of a method for transmitting image thumbnails in multiple transmissions in accordance with one or more embodiments.

FIGS. 4A-4B show, in flow diagram form, a method for transmitting image thumbnails in accordance with one or more embodiments. FIGS. 4A-4B show another example of the use of asynchronous operations by an electronic device to request image data, in this case thumbnail images, from an accessory camera device 175. FIGS. 4A-4B are distinguishable from FIG. 3 because in FIGS. 4A-4B, the accessory device can only generate and transmit a portion of the originally requested data.

The flow diagram when electronic device 100 sends an asynchronous operation to accessory device 175. In the example flow diagram, asynchronous operation 305 is called AsyncGetThumbnails. The asynchronous operation 405 in the example includes three parameters. The first parameter indicates that the request type is AsyncRequestThumbObjects because the electronic device 100 is requesting thumbnails. In one or more embodiments, the electronic device 100 may also transmit a data message 410. Data message 410 may include, for example, various parameters that indicate the type of data requested. The parameters could indicate, for example, that the electronic device 100 is requesting 640×480 thumbnails of JPEG quality 75 without embedded metadata in a storage of the accessory device 175. In this example, data message 410 may also include an indication that the electronic device 100 is requesting 50 thumbnails from accessory device 175.

In response to receiving the asynchronous operation 405, the accessory device 175 may reply with a response message 415. As indicated, the response message 415 may indicate that the asynchronous operation is acknowledged. Further, a ready response 420 is generated by the accessory device 175. As described above, the ready response may include an indication of the asynchronous operation to which the accessory device 175 is responding. In the example, the accessory device 175 is responding to the asynchronous operation with an identification of 0xF000, in this example a request for thumbnails, in ready response 420. In addition, ready response indicates that the image data is ready to be retrieved. In one or more embodiments, the image data may be generated and ready for transmission when the ready response 420 is transmitted, or the image data may be ready to be generated. As depicted, the ready response 420 includes an indication of the capability of the accessory device 175 to respond to the asynchronous operation. In one or more embodiments, the "TotalSize" parameter value may indicate the size, in bytes for example, of the image data the accessory device 175 is capable of sending to the electronic device 100. In the example, accessory device 175 may be able to only generate and transmit a portion of the 50 thumbnails at the size and quality requested, for example 40 thumbnails.

In response to receiving the ready message, the electronic device 100 may send a request message 425. In one or more embodiments, the electronic device 100 may wait for the ready message 420 before transmitting the request message 425. As depicted in example request message 425, the request message may include an operation code parameter.

After receiving the request message 425, the accessory device 175 may send a data message 430 with a thumbnail array comprising the requested data. The data message 430 may also indicate that the number of requested thumbnails was 50 but the number of thumbnails returned was 40. Thus, in one or more embodiments, the accessory device 175 may generate and send less data than originally requested, and may indicate to the requesting electronic device 100 how much data is transmitted compared to how much data was originally requested. In one or more embodiments, the accessory device 175 may also transmit a response message 435 indicating that the transmission of the image data requested in the asynchronous operation 405 is complete to the point that the accessory device 175 indicated was possible.

The flow diagram continues at 445. After the accessory device 175 returns the initial 40 images, then the electronic device 100 may send an additional asynchronous operation 445 for more thumbnails without embedded metadata in a storage of the accessory device 175. In one or more embodiments, the electronic device 100 may also transmit a data message 450. Data message 450 may include, for example, ObjectHandleArray. In this example, data message 450 may also include an indication that the electronic device 100 is requesting the remaining 10 thumbnails from accessory device 175.

The flow diagram continues at FIG. 4B. In response to receiving the asynchronous operation 445, the accessory device 175 may reply with a response message 455. As indicated, the response message 455 may indicate that the asynchronous operation is acknowledged. Further, a ready response 460 is generated by the accessory device 175. As described above, the ready response may include an indication of the asynchronous operation to which the accessory device 175 is responding, in this example 0xF000. In the example, the accessory device 175 is responding to the asynchronous operation with an identification of 0x9401 in ready response 460. In addition, ready response indicates that the image data is ready to be retrieved. In one or more embodiments, the image data may be generated and ready for transmission when the ready response 460 is transmitted, or the image data may be ready to be generated. As depicted, the ready response 460 includes an indication of the capability of the accessory device 175 to respond to the asynchronous operation through the parameter TotalSize. In the example, accessory device 175 may be able to generate and transmit the remaining 10 thumbnails at the size and quality requested.

In response to receiving the ready message, the electronic device 100 may send a request message 465. In one or more embodiments, the electronic device 100 may wait for the ready message 460 before transmitting the request message 465. As depicted in example request message 465, the request message may include an operation code parameter.

After receiving the request message 465, the accessory device 175 may send a data message 470 with a thumbnail array comprising the remaining 10 thumbnails. The data message 430 may also indicate that the number of requested thumbnails was 10 and the number of thumbnails returned was 10. Thus, in one or more embodiments, the accessory device 175 may generate and send the same amount data as originally requested, and may indicate to the requesting electronic device 100 how much data is transmitted compared to how much data was originally requested. In one or more embodiments, the accessory device 175 may also transmit a response message 475 indicating that the transmission of the image data requested in the asynchronous operation 445 is complete to the point that the accessory device 175 indicated was possible.

Figure 5:
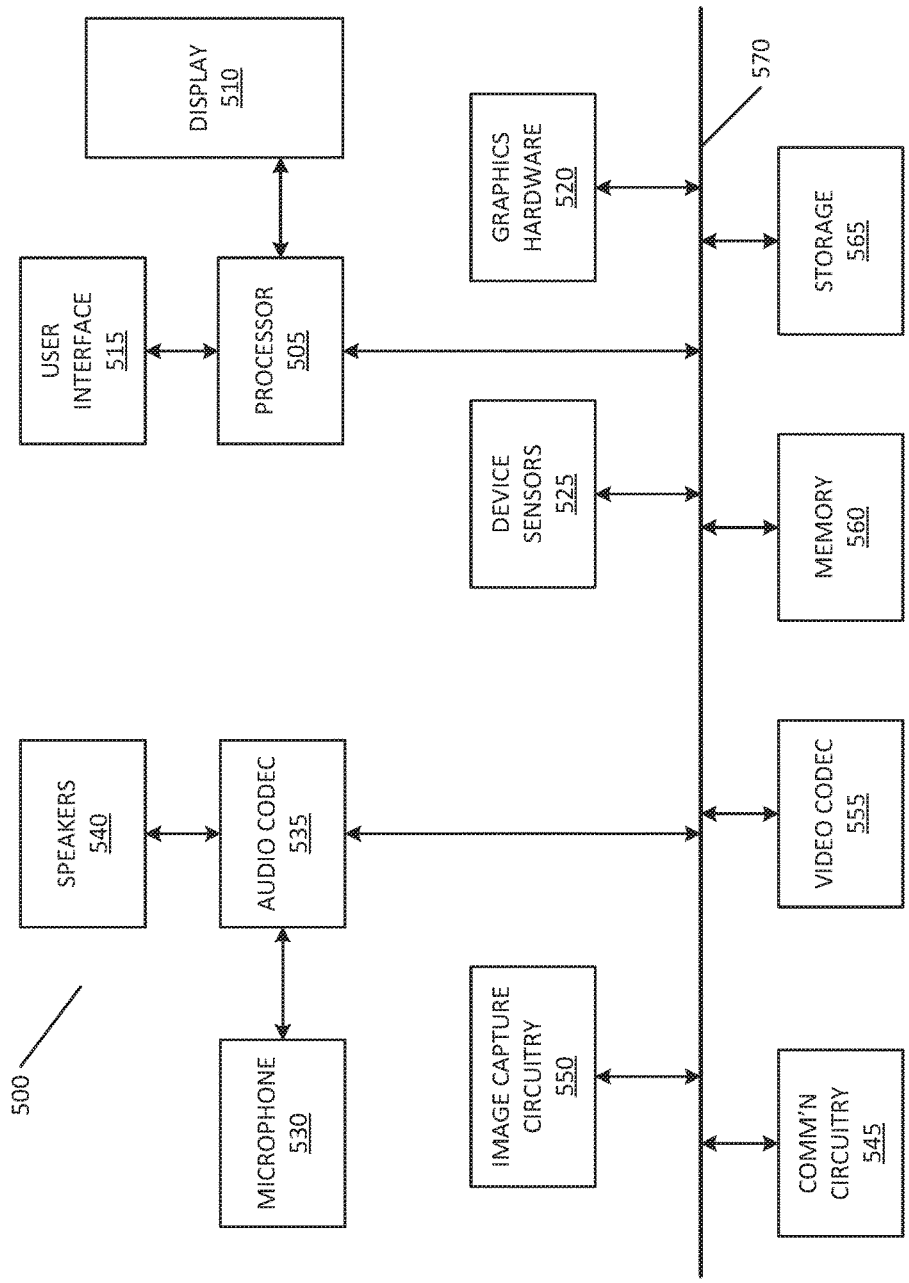
FIG. 5 shows, in block diagram form, a simplified multifunctional device according to one or more embodiments.

Referring now to FIG. 5, a simplified functional block diagram of illustrative multifunction electronic device 500, such as electronic device 100 or accessory camera device 175 according to one or more embodiments, is shown according to one embodiment. Multifunction electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture unit 550 video codec(s) 555, memory 560, storage device 565, and communications bus 570. Multifunction electronic device 500 may be, for example, a digital camera or a personal electronic device such as a personal digital assistant (PDA), personal music player, mobile telephone, or a tablet computer. In some embodiments, multifunction electronic device 500 corresponds to Electronic Device 100.

Processor 505 may execute instructions necessary to carry out or control the operation of many functions performed by device 500 (e.g., such as the generation and/or processing of images in accordance with this disclosure). Processor 505 may, for instance, drive display 510 and receive user input from user interface 515. User interface 515 may allow a user to interact with device 500. For example, user interface 515 can take a variety of forms, such as a button, keypad, dial, a click wheel, keyboard, display screen and/or a touch screen. Processor 505 may also, for example, be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 to process graphics information. In one embodiment, graphics hardware 520 may include a programmable graphics processing unit (GPU).

Sensor and camera circuitry 550 may capture still and video images that may be processed, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by, for example, processor 505 such computer program code may implement one or more of the methods described herein.

Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code which, when executed by one or more processors, causes the one or more processors to:
   receive, at an accessory camera device, an asynchronous operation request from an electronic device to obtain a first number of a plurality of image objects from the accessory camera device, wherein the asynchronous operation request includes a first parameter indicative of a requested type of asynchronous operation;
   determine, by the accessory camera device, an amount of data the accessory camera device is capable of transmitting to the electronic device for responding to the asynchronous operation request;
   determine, by the accessory camera device and based on the first parameter and the amount of data the accessory camera device is capable of transmitting, a second number of the image objects that the accessory camera device is capable of transmitting to the electronic device;
   transmit, from the accessory camera device to the electronic device, a ready message that includes a second parameter indicative of the amount of data the accessory camera device is capable of transmitting to the electronic device;
   receive, at the accessory camera device and from the electronic device, a request message to transmit the image objects to the electronic device; and
   send, by the accessory camera device and based on the request message, a data message comprising at least some of the image objects to the electronic device, wherein a number of the image objects within the data message is equal to the second number of the image objects.

2. The non-transitory computer readable medium of claim 1, wherein the second number is less than the first number and wherein the computer readable code further causes the one or more processors to:
   receive, by the accessory camera device, a retrieve message that requests a portion of the image objects not previously received in the data message; and send, by the accessory camera device, a second data message comprising a third number of the image objects after receiving a second asynchronous operation request and based on a determination that the second number is less than the first number, wherein the third number of the image objects is a difference between the first number and the second number.

3. The non-transitory computer readable medium of claim 1, wherein the first parameter indicates that the image objects are thumbnail images.

4. The non-transitory computer readable medium of claim 1, wherein the data message includes a third parameter indicative of the second number of the image objects.

5. The non-transitory computer readable medium of claim 1, wherein the computer readable code further causes the one or more processors to receive, at the accessory camera device and prior to transmitting the ready message, a second data message from the electronic device that includes a third parameter indicative of the first number of the image objects requested from the accessory camera device.

6. The non-transitory computer readable medium of claim 1, wherein the asynchronous operation request, the ready message, the request message and the data message conform with a Picture Transfer Protocol.

7. The non-transitory computer readable medium of claim 1, wherein the second parameter is indicative of a file size.

8. A method for image transport, comprising:
receiving, at an accessory camera device, an asynchronous operation request from an electronic device to obtain from the accessory camera device a first number of a plurality of image objects, wherein the asynchronous operation request includes a first parameter indicative of a requested type of asynchronous operation;
determining, by the accessory camera device, an amount of data the accessory camera device is capable of transmitting to the electronic device for responding to the asynchronous operation request;
determining, by the accessory camera device and based on the first parameter and the amount of data the accessory camera device is capable of transmitting, a second number of the image objects that the accessory camera device is capable of transmitting to the electronic device;
transmitting, from the accessory camera device to the electronic device, a ready message indicating the accessory camera device is ready for transmission of one or more of the image objects, wherein the ready message includes a second parameter indicative of the amount of data the accessory camera device is capable of transmitting to the electronic device;
receiving, at the accessory camera device and from the electronic device, a request message to transmit the image objects to the electronic device; and
sending, by the accessory camera device and based on the request message, a data message comprising at least some of the image objects to the electronic device, wherein a number of the image objects within the data message is equal to the second number of the image objects.

9. The method of claim 8, wherein the second number is less than the first number, and wherein the method further comprises:
receiving, by the accessory camera device, a retrieve message that requests a portion of the image objects not previously received in the data message; and
sending, by the accessory camera device, a second data message comprising a third number of the image objects after receiving a second asynchronous operation request and based on a determination that the second number is less than the first number.

10. The method of claim 9, wherein the third number of the image objects is equal to a difference between the first number and the second number.

11. The method of claim 8, wherein the first parameter indicates that the image objects are thumbnail images with metadata.

12. The method of claim 8, further comprising receiving, at the accessory camera device and prior to transmitting the ready message, a second data message from the electronic device that includes a third parameter indicative of the first number of the image objects requested from the accessory camera device.

13. The method of claim 8, wherein the asynchronous operation request, the ready message, the request message and the data message conform with a Picture Transfer Protocol.

14. The method of claim 8, wherein the second parameter indicates a file size.

15. A system for image data transport, comprising:
one or more processors; and
a memory operatively coupled to the one or more processors and comprising computer code configured to cause the one or more processors to:
receive, at an accessory camera device, an asynchronous operation request from an electronic device to obtain from the accessory camera device a first number of a plurality of image objects, wherein the asynchronous operation request includes a first parameter indicative of a requested type of asynchronous operation;
determine, by the accessory camera device, an amount of data the accessory camera device is capable of transmitting to the electronic device for responding to the asynchronous operation request;
determine, by the accessory camera device and based on the first parameter and the amount of data the accessory camera device is capable of transmitting, a second number of the image objects that the accessory camera device is capable of transmitting to the electronic device;
transmit, from the accessory camera device to the electronic device, a ready message that includes a second parameter indicative of the amount of data the accessory camera device is capable of transmitting to the electronic device;
receive, at the accessory camera device and from the electronic device, a request message to transmit the image objects to the electronic device; and
send, by the accessory camera device and based on the request message, a data message comprising at least some of the image objects to the electronic device, wherein a number of the image objects within the data message is equal to the second number of the image objects.

16. The system of claim 15, wherein the second number is less than the first number, and wherein the computer code is configured to further causes the one or more processors to:
receive, at the accessory camera device, a retrieve message that requests a portion of the image objects not previously received in the data message; and
send, by the accessory camera device, a second data message comprising a third number of the image objects after receiving a second asynchronous operation request and based on a determination that the second number is less than the first number.

17. The system of claim 16, wherein the third number of the image objects is equal to a difference between the first number and the second number.

18. The system of claim 15, wherein the first parameter indicates that the image objects are thumbnail images.

19. The system of claim 15, wherein the computer code is configured to further cause the one or more processors to receive, at the accessory camera device and prior to transmitting the ready message, a second data message from the electronic device that includes a third parameter indicative of the first number of the image objects requested from the accessory camera device.

20. The system of claim 15, wherein the asynchronous operation request, the ready message, the request message and the data message are transferred during a Picture Transfer Protocol session.

21. The system of claim 15, wherein the second parameter is indicative of a file size.

\* \* \* \* \*